W. L. DALY.
ICE CREAM SCRAPER.
APPLICATION FILED MAY 20, 1919.
1,316,428.
Patented Sept. 16, 1919.
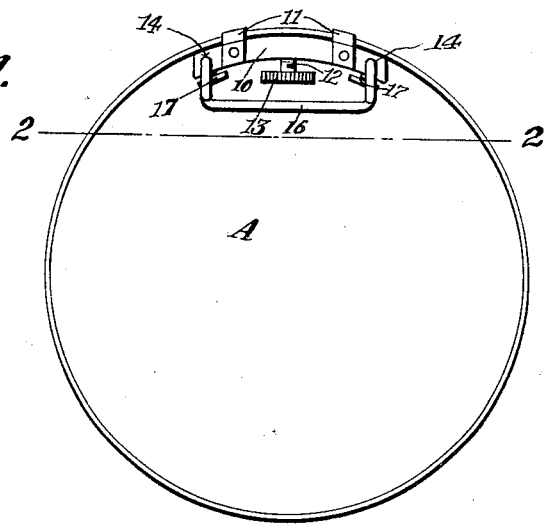
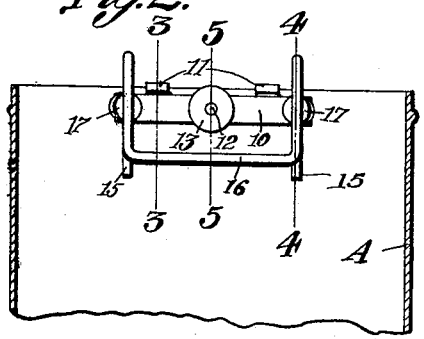
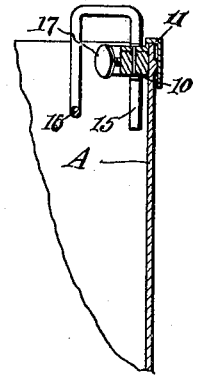
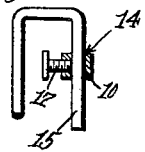
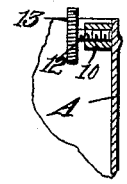
Witnesses
E. A. Buchanan.
Inventor
W. L. Daly.
By Victor J. Evans
Attorney

UNITED STATES PATENT OFFICE.

WILLIAM L. DALY, OF SCHENECTADY, NEW YORK.

ICE-CREAM SCRAPER.

1,316,428.   Specification of Letters Patent.   Patented Sept. 16, 1919.

Application filed May 20, 1919. Serial No. 298,388.

*To all whom it may concern:*

Be it known that WILLIAM L. DALY, a citizen of the United States, residing at Schenectady, in the county of Schenectady and State of New York, have invented new and useful Improvements in Ice-Cream Scrapers, of which the following is a specification.

This invention relates to attachments for ice cream cans and has for its object the provision of a device adapted for detachable engagement upon the upper portion of an ice cream can whereby the surplus ice cream projecting beyond the edge of an ice cream scoop of the type used in soda fountains, ice cream parlors, and the like, may be removed so that a customer will not receive more than the proper stipulated amount fulfilling an order.

An important object is the provision of a device of this character which is provided with means whereby it may be quickly and easily clamped upon the top of an ice cream can without making any alterations in the construction of the can itself.

An additional object is the provision of a device of this character which will be very simple and inexpensive in manufacture, highly efficient and durable in use, and a general improvement in the art.

With the above and other objects and advantages in view, the invention consists in the details of construction to be hereinafter more fully described and claimed, and illustrated in the accompanying drawing, in which—

Figure 1 is a plan view of an ice cream can showing my device applied thereto,

Fig. 2 is a longitudinal sectional view through the can, showing my device in elevation, Fig. 3 is a detail sectional view on the line 3—3 of Fig. 2, Fig. 4 is a detail sectional view on the line 4—4 of Fig. 2, and Fig. 5 is a detail sectional view on the line 5—5 of Fig. 2.

Referring more particularly to the drawing, the letter A designates an ice cream can of ordinary construction.

In carrying out my invention I provide a longitudinally curved bar 10 which is formed for substantially conforming engagement against the periphery of the can A and which is preferably square in cross section. Secured upon the top of the bar 10 at points spaced from the ends thereof are resilient clamping fingers 11 which are adapted to extend over the edge of the can and to engage against the outer periphery thereof. At substantially its center, the bar 10 is provided with a set screw comprising a threaded shank 12 engaging through the bar and having its point adapted for engagement against the inner periphery of the can. This set screw is provided with a relatively large disk-like head 13 having a milled or knurled edge whereby it may be conveniently grasped by an operator and rotated into close engagement with the can. It will be seen that when the set screw 12 is tightened the bar 10 will be securely clamped upon the upper edge of the can.

At its ends, the bar 10 has formed therein vertically extending holes 14 within which are slidably engaged vertical arms 15 of a scraper member including a horizontal portion 16. Set screws 17 are threaded into the bar 10 adjacent its ends and engaged against the arms 15 of the scraper member for holding the scraper member firmly in position with respect to the bar 10.

When the parts are assembled and secured upon the can as above described and as illustrated in the drawings, it will be apparent that the horizontal portion 16 of the scraper member will be disposed inwardly of the inner periphery of the can A in convenient position to have the ordinary ice cream scraper rubbed thereover so as to remove from the scoop any surplus ice cream projecting beyond the open end thereof so that this surplus ice cream will be removed and will fall into the can A. In this manner it will be seen that the customer will be given only the amount of ice cream remaining within the scoop itself and that waste will therefore be prevented.

From the foregoing description and a study of the drawing it will be apparent that I have thus provided an extremely simple and inexpensive device which may be quickly and easily engaged upon the upper edge of an ice cream can and which will provide means whereby surplus ice cream projecting beyond the end of the ice cream scoop or ladle may be removed in a thorough and expeditious manner.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. An attachment for an ice cream can comprising an arcuate bar adapted for substantially conforming engagement with the inner periphery of a can, spring clamping members carried by said bar, extending over the top edge of the can and engaging against the outer periphery thereof, a set screw threaded through said bar and engaging against the inner periphery of the can, and a scraper member carried by said bar and extending toward the center of the can.

2. An attachment for an ice cream can comprising a bar adapted for disposition against the inner periphery of the ice cream can at the upper edge thereof, clamping members carried by said bar, extending over the upper edge of the can and engaging against the outer periphery thereof, a set screw extending through said bar and engaging against the inner periphery of the can, the end portions of said bar being provided with vertical holes, a scraper member including a horizontal portion extending toward the center of the can, and vertical arms slidably disposed within said vertical holes, and set screws threaded into said bar and engaging said vertical arms.

In testimony whereof I affix my signature.

WILLIAM L. DALY.

Copies of this patent may be obtained for five cents each, by addressing the "Commissioner of Patents, Washington, D. C."